Dec. 18, 1962  P. L. E. KUNTZMANN  3,068,712
TRANSMISSION CHAIN
Filed Jan. 9, 1961
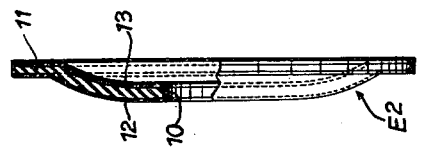
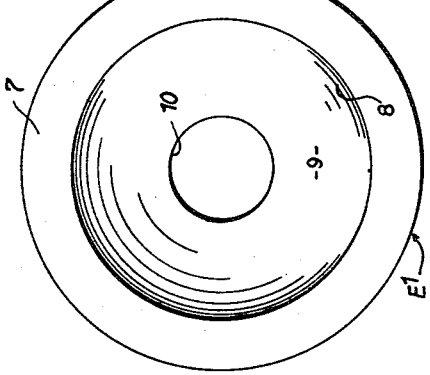
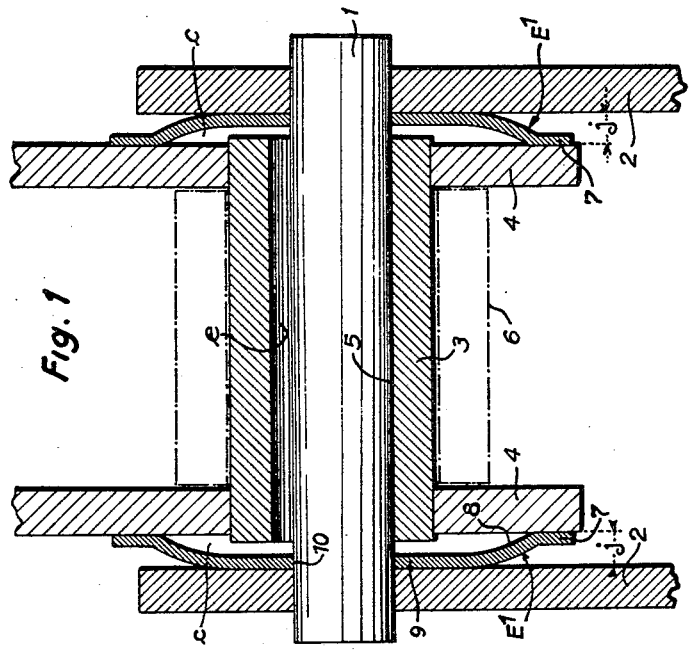

3,068,712
TRANSMISSION CHAIN
Paul Louis Emile Kuntzmann, Villejuif, France, assignor to Compagnie des Transmissions Mecaniques Seine-Doubs-Isere, Levallois-Perret, France, a French body corporate
Filed Jan. 9, 1961, Ser. No. 81,304
Claims priority, application France Jan. 15, 1960
15 Claims. (Cl. 74—255)

The present invention relates to transmission chains of the type meshing with toothed gears or sprockets.

It is known that in conventional chains, either of the roller or of the so-called "noiseless" type, the pivotal interconnection of the links is achieved through the rotation of a generally solid pin within the bore of at least one bushing or "false roller," these elements being rigidly attached to plane spacers constituting the side members or plates of the roller chains or noiseless chains.

In order to enable the pin to rotate in the bushing, these two elements are assembled with a certain amount of clearance. Moreover, in order to avoid wedging effects between the alternate successive inner and outer chain links, owing to the partial overlapping of the inner plates by the outer plates of the adjacent link, a certain lateral clearance has to be provided between the adjacent inner and outer plates of the chain.

When a chain is rotated in abrasive surroundings without any adequate protection, there is a possibility for the abrasive particles to penetrate into each pivotal connection between the pin and the associated bushing of the connection, by infiltration between the outer and inner plates rigidly attached to the elements of the corresponding pivotal connection. This leads to an undue wear, a serious consequence of which is an increase of the effective pitch of the chain, deleteriously affecting the accurate meshing thereof with the associated toothed gears and sprockets.

The object of the invention is to prevent foreign matters and, in particular, abrasive particles, from infiltrating between the elements of the pivotal connections of a transmission chain, thus considerably reducing the cause of the wear thereof. Accordingly, the invention provides an improved transmission chain, of the type including a pivotal connection comprising a pin and a bushing, said chain comprising in each pivotal connection two sealing members, each being adjacent a pair of plane internal and external plates and bearing, on the one hand, on the pin and, on the other hand, on the inner plate or the bushing integral therewith.

In accordance with one preferred embodiment, each of the sealing members comprises a resilient cup or dished washer having a central hole bored therein, through which said pin extends, the outer edge of said sealing member being supported against the outer face of the inner plate, in the manner of a suction cup.

Further features for the invention will become apparent from the following description in reference to the accompanying drawing, given only to illustrate the invention and in which:

FIG. 1 is a cross-sectional view of a pivotal connection for a roller-type chain, provided with sealing members, according to the invention;

FIG. 2 is a front view of one of the integrally formed cups forming one of said sealing members, and FIG. 3 is a part-sectional side view of an alternative embodiment of a composite cup, before mounting.

In the illustrative embodiment shown in FIGS. 1 and 2, the invention is applied to a conventional roller-type chain. The solid pin 1 of the illustrative pivotal connection is tightly fitted or otherwise secured, e.g. by crimping, welding or riveting, in both outer spacers or plates 2, whereas the bushing 3 is similarly force-fitted in the two inner spacers or plates 4. These plates 2 and 4 provide the flat spacers of the links, pivotally connected with one another by means of successive connections similar to that shown in the drawing.

When the chain is tensioned, the pin 1 is bearing along one of the generating lines thereof against the surface of the bore 5 in the bushing 3, the diameter of said bore being slightly larger than that of pin 1, whereby a gap or clearance $e$ is afforded therebetween at a location diametrically opposed to the contact generatrix. The product used for lubricating the connection is placed in this clearance $e$ or, more precisely, in the clearance evenly provided around the pin 1 when, in inoperative position, the latter is coaxial to the bushing 3.

This bushing 3 can have mounted thereon the conventional freely rotative roller 6 shown in dash-dot in FIG. 1.

In the transverse direction, a relatively large clearance $j$, of about 1 mm., is afforded between the confronting faces of each of the outer plates 2 and of the corresponding inner plates 4, and, in accordance with the invention, this particular clearance is used to seal the gap $e$ between the pin 1 and the bushing 3 of the pivotal connection.

Thus, according to the invention, each outer plate 2 and the corresponding inner plate 4 have located therebetween a sealing member $E^1$ comprised by a dished washer forming a kind of cup. It includes a plane peripheral portion or flange 7, followed by a curved annular portion 8, having a substantially spherical or frusto-conical shape and gradually merging with a flat central portion 9 having a central hole 10 bored therein.

The diameter of this central hole 10 accurately corresponds to that of the pin 1, so that this member or washer $E^1$ can be freely mounted, but without clearance, on said pin, while coming to bear by its flat outer portion 7 against the outer surface of the inner plate 4, somewhat in the manner of a suction cup, and by its flat central portion or inner flange 9 against the inner face of the outer plate 2.

Each sealing washer $E^1$ is in one piece and may be formed either of thin pressed into shape metal or of a deformable and flexible moulded material, such as neoprene, superpolyamide, polyethylene or the like.

Upon rotation of the pin 1 within the bore 5 of the bushing 3, each washer $E^1$ remains integral with the corresponding inner plate 4, owing to the friction between this plate and the flat portion 7, the washer being subjected to a slight resilient compression between the plates 2 and 4, while the pin 1 is journalled in the bore 10 (or vice versa). It will be appreciated that this arrangement provides an effective seal for the space $e$ and both recesses $c$ provided by the two cups or washers having the clearance $e$ communicating therewith.

In FIG. 3 is shown an alternative embodiment of a sealing member $E^2$ comprised by a composite type of washer, consisting of a body portion 11 formed of a flexible and deformable material, offering a good resistance to the lubricating products, for example, of suitably hard neoprene, and of two reinforcements 12 and 13 clamped about this body 11 and positioned during the moulding and curing steps of said body 11, in the form of two mats of foamed superpolyamide fabric. This composite washer $E^2$ has a higher wear and tear strength, without losing any of its resiliency.

It is to be understood that the scope of invention is not restricted to the illustrated and described embodiments, which have been chosen merely by way of examples; said scope being defined in the appended claims. Thus, the sealing elements could bear directly against the end faces of the bushing 3, provided said faces are large enough.

Moreover, the scope of the invention is not restricted to illustrated roller-type chains, but can be similarly applied to noiseless chains, in which case each pin 1 is integral with two outer side plates 2, while said pin has mounted side-by-side thereon a plurality of bushings similar to that disclosed in the foregoing example, but shorter than the latter, and each bushing being tightly fitted or otherwise secured to two inner plates which are connected or otherwise.

Having now described my invention what I claim as new and desire to secure by Letters Patent is:

1. In a transmission chain comprising a first link element and a pin carried by the latter, a second link element having a bore in which the pin is journalled, the first and second link elements being in partly overlapping spaced relationship to each other; a sealing element which is disposed between the overlapping parts of the link elements and is in the form of an annular wall shaped so as to comprise a flat inner flange engaged round the pin and in abutting relationship to the first link element, a flat outer flange offset from the inner flange in the direction toward the second link element with which latter it is in abutting relationship, an intermediate annular portion interconnecting the flanges, and a recess adjacent the second link element and defined by the inner flange and the intermediate portion.

2. A transmission chain comprising a first link element and a pin carried by the latter, a second link element having a bore in which the pin is journalled, the first link element having a first face surrounding the pin and the second link element having a second face surrounding the bore, the first and second faces being in overlapping spaced relationship to each other; a sealing element which is disposed between the first and second faces and is in the form of an annular wall shaped so as to comprise a flat inner flange engaged round the pin and in abutting relationship to the first face, a flat outer flange offset from the inner flange in the direction toward the second face with which latter it is in abutting relationship, an intermediate annular portion interconnecting the flanges, and a recess adjacent the second face and defined by the inner flange and the intermediate portion, said first and second faces being flat in the regions thereof in abutting relationship to the sealing element.

3. A transmission chain as claimed in claim 2, wherein the first and second faces and the inner flange and outer flange are contained in parallel planes perpendicular to the pin.

4. A transmission chain as claimed in claim 2, wherein the intermediate portion is located nearer to the outer periphery of the sealing element than to the pin.

5. A transmission chain as claimed in claim 2, wherein the intermediate portion is concave on the recess side of the annular wall and merges into the inner flange.

6. A transmission chain as claimed in claim 2, wherein the extent of the intermediate annular portion radially of the pin is less than the total radial extent of the two flanges.

7. In a transmission chain comprising a first link element and a pin carried by the latter, a second link element having a bore in which the pin is journalled; the first link element having a first face surrounding the pin and the second link element having a second face surrounding the bore, the first and second faces being in overlapping spaced relationship to each other; a sealing element which is disposed between the first and second faces and is in the form of a resiliently yieldable annular wall shaped so as to comprise a flat inner flange engaged round the pin and in abutting relationship to the first face, a flat outer flange offset from the inner flange in the direction toward the second flat face with which latter it is in abutting relationship, an intermediate annular portion interconnecting the flanges, and a recess adjacent the second face and defined by the inner flange and the intermediate portion; means being provided to prevent the pin from moving out of the bore and the sealing element being slightly compressed between the first and second faces, which first and second faces are flat in the regions thereof in abutting relationship to the sealing element.

8. A transmission chain as claimed in claim 2, wherein the annular wall is resiliently yieldable and composed of metal.

9. A transmission chain as claimed in claim 2, wherein the annular wall is resiliently yieldable neoprene.

10. A transmission chain as claimed in claim 2, wherein the annular wall is resiliently yieldable and composite and comprises an inner wall of plastic and a layer disposed on each side of the inner wall and composed of a reinforcing material.

11. A transmission chain as claimed in claim 10, wherein the reinforcing material is a superpolyamide foam material.

12. In a pivotal connection for a transmission chain, two first plates in spaced relationship to each other and a pin interconnecting the plates, two second plates in spaced relationship to each other and a bushing interconnecting the second plates, the pin being journalled in the bushing and the second plates being disposed within the first plates in partly overlapping spaced relationship thereto, two sealing elements rotatably mounted on the pin and disposed between the overlapping parts of the first and second plates, each sealing element being in the form of an annular wall shaped so as to comprise a flat inner flange engaged round the pin and in abutting relationship to the first plate, a flat outer flange offset from the inner flange in the direction toward the second plate with which latter it is in abutting relationship, an intermediate annular portion interconnecting the flanges, and a recess adjacent the second plate and defined by the inner flange and the intermediate portion.

13. Pivotal connection as claimed in claim 12, wherein each sealing element is resiliently yieldable and is slightly compressed between the first and second plates adjacent thereto.

14. A transmission chain as claimed in claim 2, wherein the annular wall is resiliently yieldable superpolyamide.

15. A transmission chain as claimed in claim 2, wherein the annular wall is resiliently yieldable polyethylene.

References Cited in the file of this patent

UNITED STATES PATENTS

| | | |
|---|---|---|
| 1,930,312 | Greenhoe | Oct. 10, 1933 |
| 2,336,913 | Albrecht | Dec. 14, 1943 |

FOREIGN PATENTS

| | | |
|---|---|---|
| 537,315 | Belgium | Apr. 30, 1955 |